United States Patent
Deng et al.

(10) Patent No.: US 7,992,920 B2
(45) Date of Patent: Aug. 9, 2011

(54) DOOR BLOCK ARRANGEMENT FOR ENERGY ABSORBING VEHICLE DOOR

(75) Inventors: Zhibing Deng, Northville, MI (US); Djamal Eddine Midoun, Ann Arbor, MI (US); Shekar Prabhakar Erasala, Northville, MI (US); Chunhui Kevin Lee, Troy, MI (US); Liqi Dong, Novi, MI (US); Tracy Christopher Bakos, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 12/684,923

(22) Filed: Jan. 9, 2010

(65) Prior Publication Data

US 2011/0169302 A1    Jul. 14, 2011

(51) Int. Cl.
*B60J 5/00* (2006.01)
(52) U.S. Cl. .............................. 296/146.6; 296/187.12
(58) Field of Classification Search .............. 296/39.1, 296/146.5, 146.6, 146.7, 150, 153, 187.03, 296/187.05, 187.12
See application file for complete search history.

(56) References Cited

U.S. PATENT DOCUMENTS

| | | | |
|---|---|---|---|
| 4,231,607 A | 11/1980 | Bohlin | |
| 5,395,135 A | 3/1995 | Lim et al. | |
| 5,542,738 A | 8/1996 | Walker et al. | |
| 5,749,600 A | 5/1998 | Yamada et al. | |
| 6,164,716 A * | 12/2000 | Palazzolo et al. | 296/187.12 |
| 6,203,096 B1 | 3/2001 | Noda et al. | |
| 6,474,721 B2 | 11/2002 | Nishikawa et al. | |
| 6,955,391 B1 | 10/2005 | Peng | |
| 7,014,249 B2 * | 3/2006 | Karuppaswamy et al. | 296/146.6 |
| 7,291,378 B2 | 11/2007 | Cowelchuk et al. | |
| 7,357,444 B2 | 4/2008 | Cowelchuk et al. | |
| 7,857,375 B2 * | 12/2010 | Huttsell et al. | 296/146.6 |
| 2002/0113462 A1 | 8/2002 | Heranney | |

* cited by examiner

*Primary Examiner* — Dennis H Pedder
*Assistant Examiner* — Jason Daniels
(74) *Attorney, Agent, or Firm* — Shook, Hardy & Bacon LLP

(57) ABSTRACT

An energy absorbing vehicle door having a door block strategically located within the door is disclosed. The door block has an upper portion and a lower portion. The upper portion is wider than the lower portion and is attached to the inner panel of the door. A door beam is provided between the inner panel of the door and the outer panel. A portion of the door beam is positioned between the inner panel and the lower portion of the door block. The door beam may be attached to the lower portion of the door block. The attachment surface of the lower portion of the door block may have a geometry that is the same as or is substantially the same as the geometry of the door beam.

20 Claims, 6 Drawing Sheets

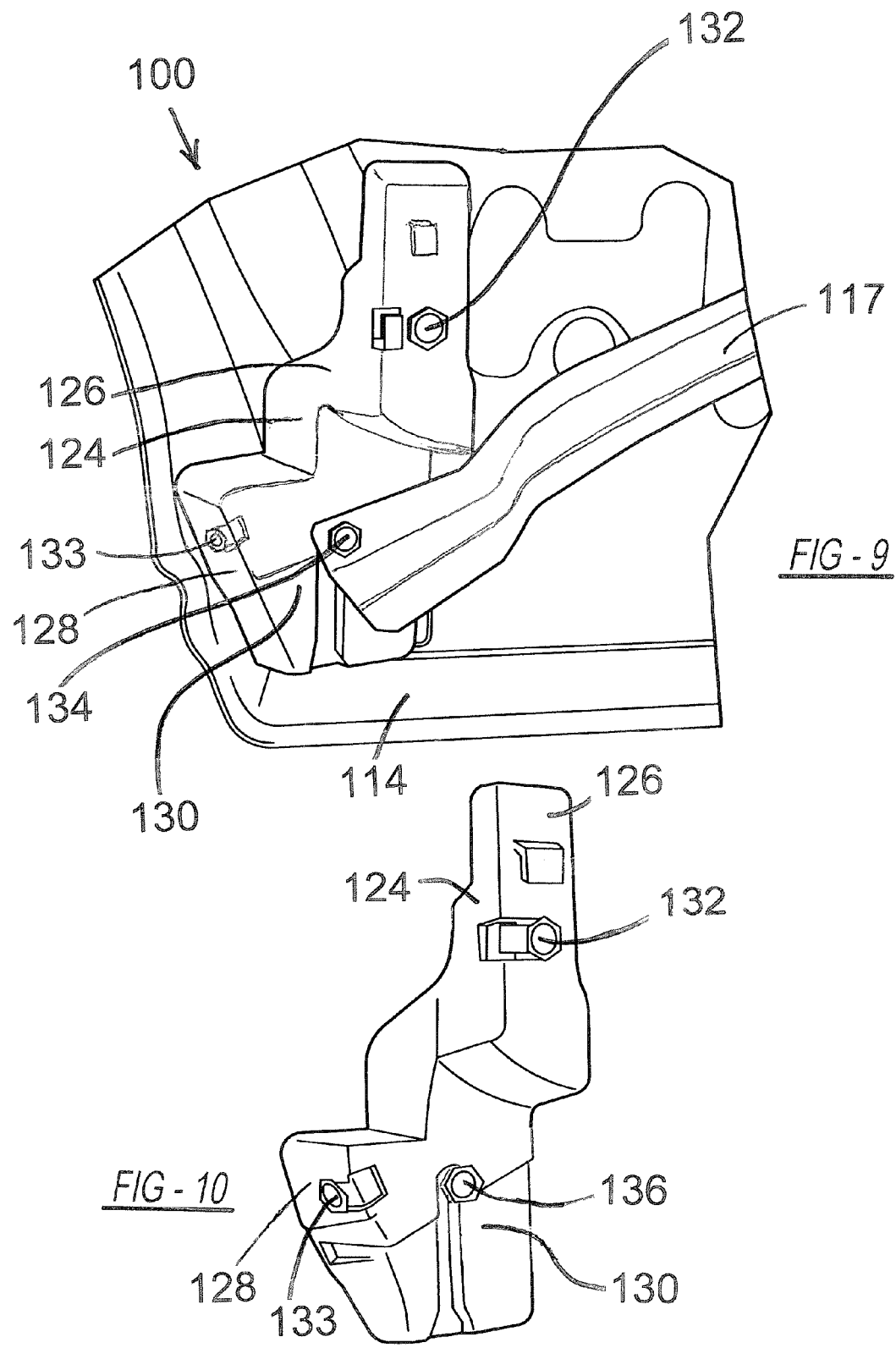

US 7,992,920 B2

DOOR BLOCK ARRANGEMENT FOR ENERGY ABSORBING VEHICLE DOOR

TECHNICAL FIELD

The present invention relates generally to block structures for use with vehicle doors. More particularly, the present invention relates to a door block formed from a rigid material and placed at the rear of the door between the door inner sheet metal outboard of the door beam and the outer door skin. The door block halts incoming intrusion in a side impact event whether the intrusion is in a lateral direction or a longitudinal direction.

BACKGROUND OF THE INVENTION

Vehicle doors are typically constructed with two or more panels attached to the door frame, including an exterior or outer panel for shielding the passenger compartment from the elements, and an inner door panel which provides structural support. A trim panel is usually fastened to the inner door panel facing the passenger compartment and shields the vehicle occupants from internal door components, such as the window, the window regulator and the door locks. The trim panel can also provide aesthetic qualities to the interior passenger compartment as well as ergonomic features, for example, easily accessible door handles, mirror and window controls, and the like.

It is known that vehicles may collide with obstacles during operation. As a result, automotive vehicles have been provided with various structural upgrades and restraint systems to lessen the effects of a collision type impact on an occupant compartment of the vehicle. Particularly, to lessen the effects of a side collision type impact of the vehicle occupant seating area, some vehicle door constructions may include a door intrusion guard beam, side bolsters of foam or honeycomb construction, or other body side structural upgrades. While such structural upgrades provide certain advantages, often they are often relatively expensive and weighty. In addition, many of the known designs are effective in the instance of lateral intrusion but not as effective in the instance of longitudinal intrusion.

Accordingly, as in so many areas of vehicle technology, there is room in the art of vehicle door design for an alternative configuration to known door structures which provides effective protection regardless of the direction of impact while maintaining relatively low manufacturing and assembly costs.

SUMMARY OF THE INVENTION

The present invention generally provides a door assembly in which the energy absorption characteristics are integrated in the vehicle door by providing a door block strategically located within the door. The door block may be composed of any of a variety of materials, including metals such as aluminum.

The door block of the disclosed invention is fitted between the inner panel of the vehicle door and the outer panel of the vehicle door. A door beam is provided in the vehicle door assembly of the disclosed invention.

The door block has an upper portion and a lower portion. The upper portion is wider than the lower portion. The upper portion is itself attached to the inner panel of the vehicle door. The lower portion is spaced apart from the inner panel of the vehicle door. A portion of the door beam is fitted between the lower portion of the door block and the inner panel of the vehicle door.

The lower portion of the door block has a door beam attachment surface to which the door beam is attached. The door beam attachment surface has a geometry which is substantially the same as the geometry of the door beam itself.

The door beam may be attached to the lower portion of the door block. Attachment may be accomplished by any of a variety of means including a bolt fastener. The door block may have a keyway for mating with the bolt fastener.

The structure of the vehicle door incorporating the door block of the present invention reduces structural intrusion near the rear occupant.

The door block of the disclosed invention may be strategically positioned in the lower rear section of the vehicle door, adjacent both the rocker panel and the C-pillar of the vehicle.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 9 illustrates a portion of a vehicle door assembly in partial transparent view incorporating the second embodiment of the door block of the disclosed invention shown from the inside of the door; and FIG. 10 illustrates a perspective view of the second embodiment of the door block of the disclosed invention shown from the inside.

DETAILED DESCRIPTION OF THE PREFERRED EMBODIMENT

Figure 1:
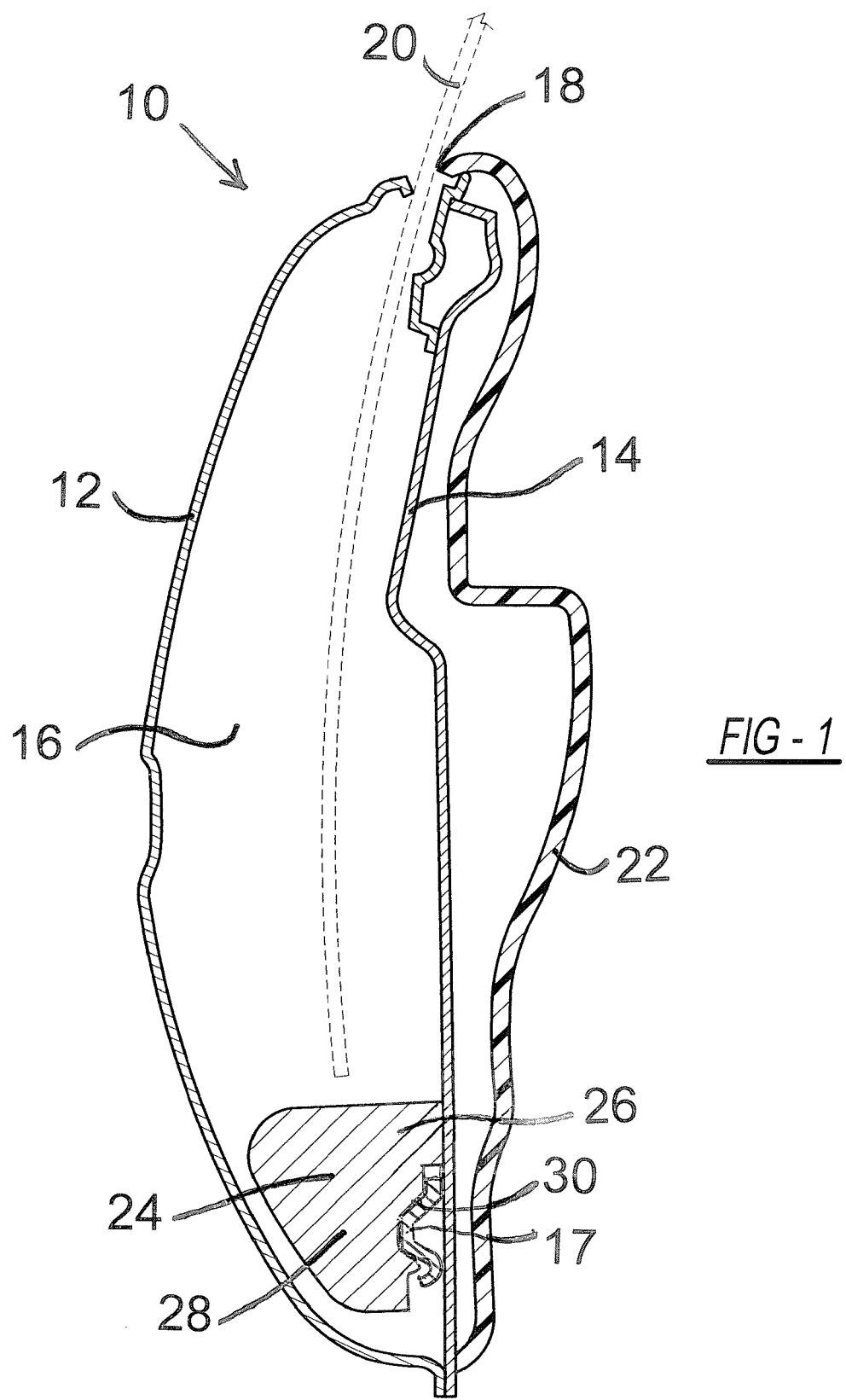
FIG. 1 illustrates a sectional view of a door assembly incorporating the first embodiment of the door block of the disclosed invention.

In the following figures, the same reference numerals will be used to refer to the same components. In the following description, various operating parameters and components are described for different constructed embodiments. These specific parameters and components are included as examples and are not meant to be limiting.

FIGS. 1 through 6 illustrate a first embodiment of the disclosed invention and FIGS. 7 through 10 illustrate a second embodiment of the disclosed invention. The illustrated embodiments are not intended as being limiting as variations of one or both of the illustrated embodiments are possible without deviating from the underlying invention disclosed herein.

Referring to the first embodiment and to FIG. 1 in particular, the energy absorbing vehicle door of the disclosed invention is shown and is generally illustrated as 10. The vehicle door 10 may be either a front door of a vehicle or the rear door of a vehicle. The vehicle door 10 includes an outer panel 12 and an inner panel 14. The outer panel 12 and the inner panel 14 are joined together in a conventional fashion to form a space 16 therebetween. The vehicle door 10 also includes an aperture 18 at an upper end for receiving a window 20, which may move in and out of the space 16. Also provided in the space 16 is a door guard beam 17. The shape and function of the door guard beam 17 is known in the art and typically extends from one side of the door to the other as is illustrated more particularly in other figures.

A window regulator device, a door latch, and other components (not shown) of a vehicle door as known in the art may also be housed in the space 16. A vehicle door trim 22 is also provided as is known in the art.

The vehicle door 10 includes a door block 24 having an upper portion 26 and a lower portion 28. The configuration of the door block illustrated herein is for demonstrative purposes only and is not intended as being limiting. The lower portion 28 of the door block 24 has a door guard beam contact surface 30 which has a geometry similar to or identical with the geometry of the door guard beam 17.

The door block 24 may be composed of a variety of materials which are structurally rigid and would be generally resistant to impacts. Such materials may include metals such as aluminum or polymerized materials such as ABS plastic.

Figure 2:
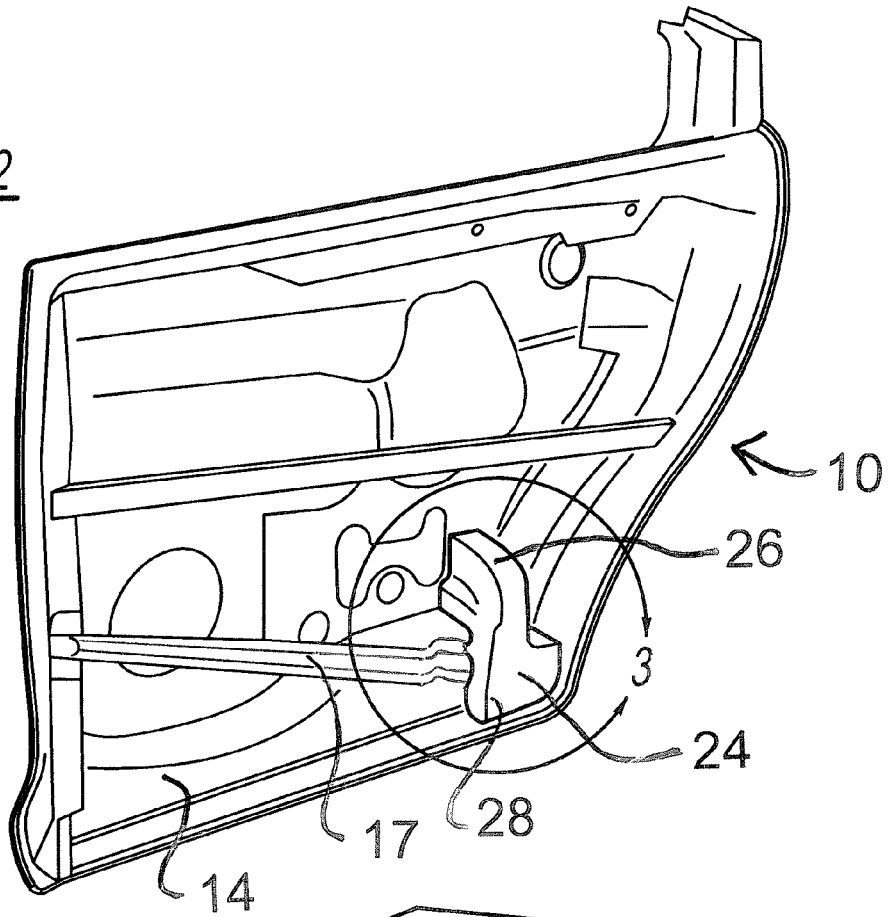
FIG. 2 illustrates a perspective view of a door assembly incorporating the door block of the first embodiment of the disclosed invention as viewed from the outside and shown without the outer panel of the vehicle door.

The configuration and placement of the door block 24 are seen more clearly in FIG. 2 which illustrates a perspective view of the vehicle door 10 shown without the outer panel of the vehicle door 10. As illustrated therein, the door block 24 is positioned at the lowest portion of the vehicle door 10. Furthermore, the door block 24 is positioned at the most rearward portion of the vehicle door 10. So positioned the door block 24 is substantially adjacent the rocker panel of the vehicle and the C-pillar of the vehicle. The door block 24 may be placed elsewhere within the vehicle door 10. Additional door blocks may be provided as well.

Figure 3:
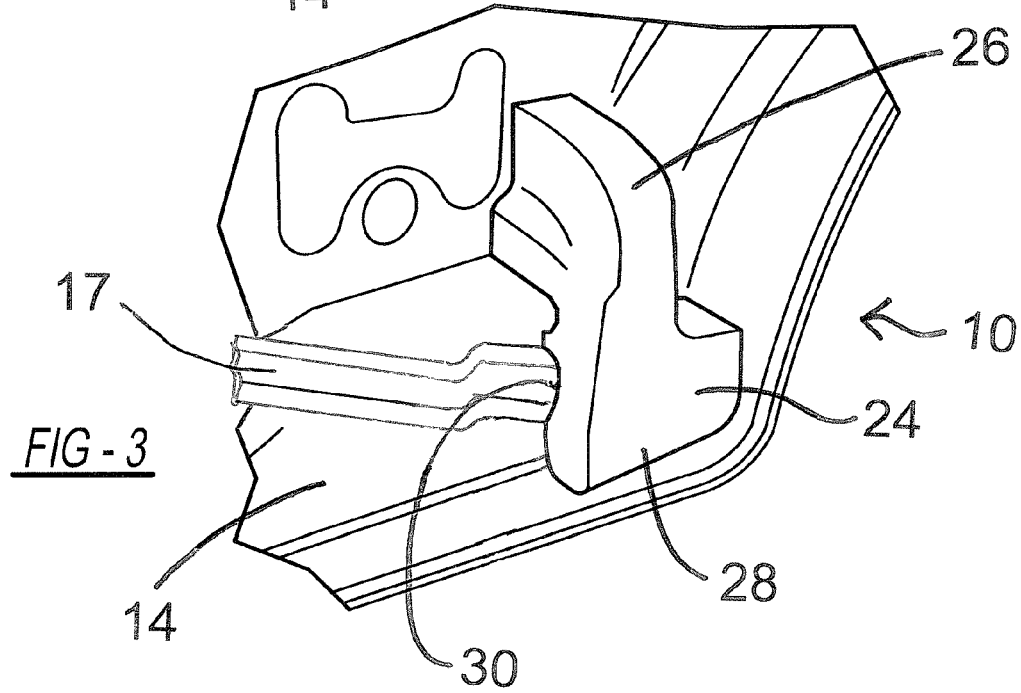
FIG. 3 illustrates a close-up view of the door block shown in FIG. 2.

FIG. 3 illustrates a more detailed view of the door block 24 of the first disclosed embodiment and its position within the vehicle door 10 and is a close-up of the view shown in FIG. 2. As illustrated in FIG. 3, the door guard beam contact surface 30 is configured so as to mate with the door guard beam 17, their geometries being the same or substantially the same. This allows the door block 24 to be well coupled with the door guard beam 17 in a side impact event.

It is to be noted that the lower portion 28 of the door block 24 is positioned outboard of the door guard beam 17. Thus positioned, during a side impact event the door block 24 engages with the door guard beam 17, the rocker panel and the C-pillar thus halting the vehicle inward movement of the vehicle door 10 or of any of its components.

Figure 4:
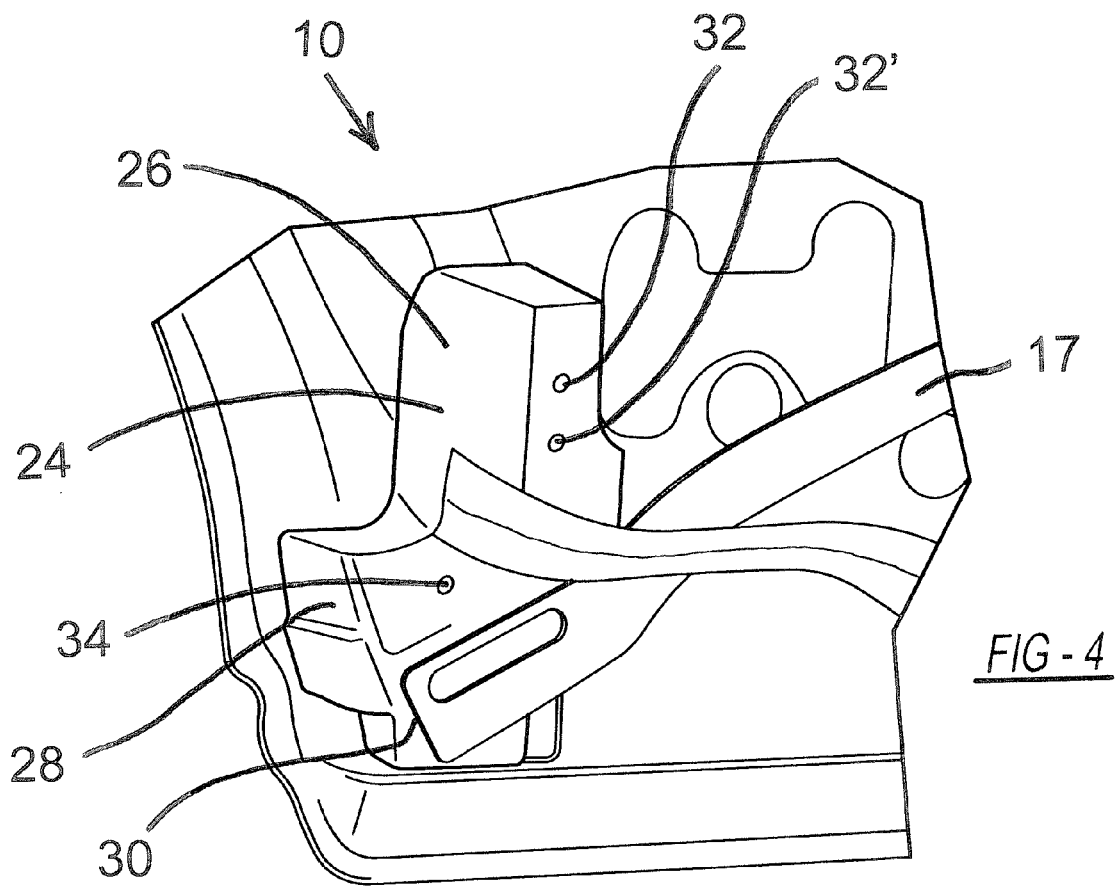
FIG. 4 illustrates a portion of a vehicle door assembly in partial transparent view incorporating the first embodiment of the door block of the disclosed invention shown from the inside of the door.
Figure 5:
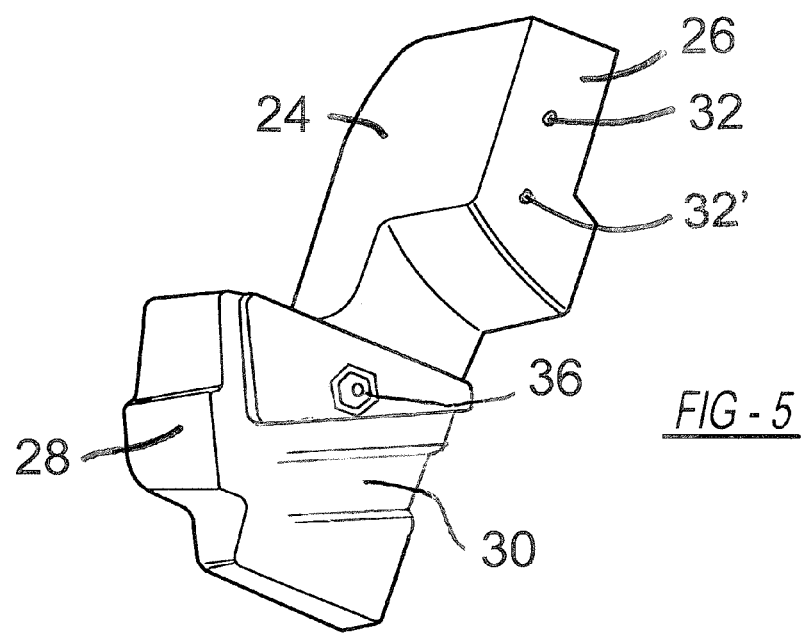
FIG. 5 illustrates a perspective view of the first embodiment of the door block of the disclosed invention shown from the inside.

FIG. 4 illustrates the vehicle door 10 when viewed from the inside of the vehicle. This figure more clearly illustrates a preferred shape of the door block 24 of the first disclosed embodiment. FIG. 5 illustrates the door block 24 in isolation.

With reference to both FIGS. 4 and 5, the upper portion 26 of the door block 24 is attached to the inner panel 14 by one or more fasteners 32 and 32'. The fasteners may be of any of a variety of fasteners known for the effective attachment of one component to another, including, for example, bolts.

The lower portion 28 of the door block 24 is attached to the door guard 17 (shown in FIG. 4) by a fastener 34. While only a single fastener 34 is shown there may be plural fasteners for such application. The fastener 34 may be any of a variety of fasteners effective for such purposes but is preferably a door beam attachment bolt. In the event that a bolt is used the door block 24 may have a keyway 36 shown in FIG. 5 shaped such that it fits the door guard beam attachment bolt.

Figure 6:
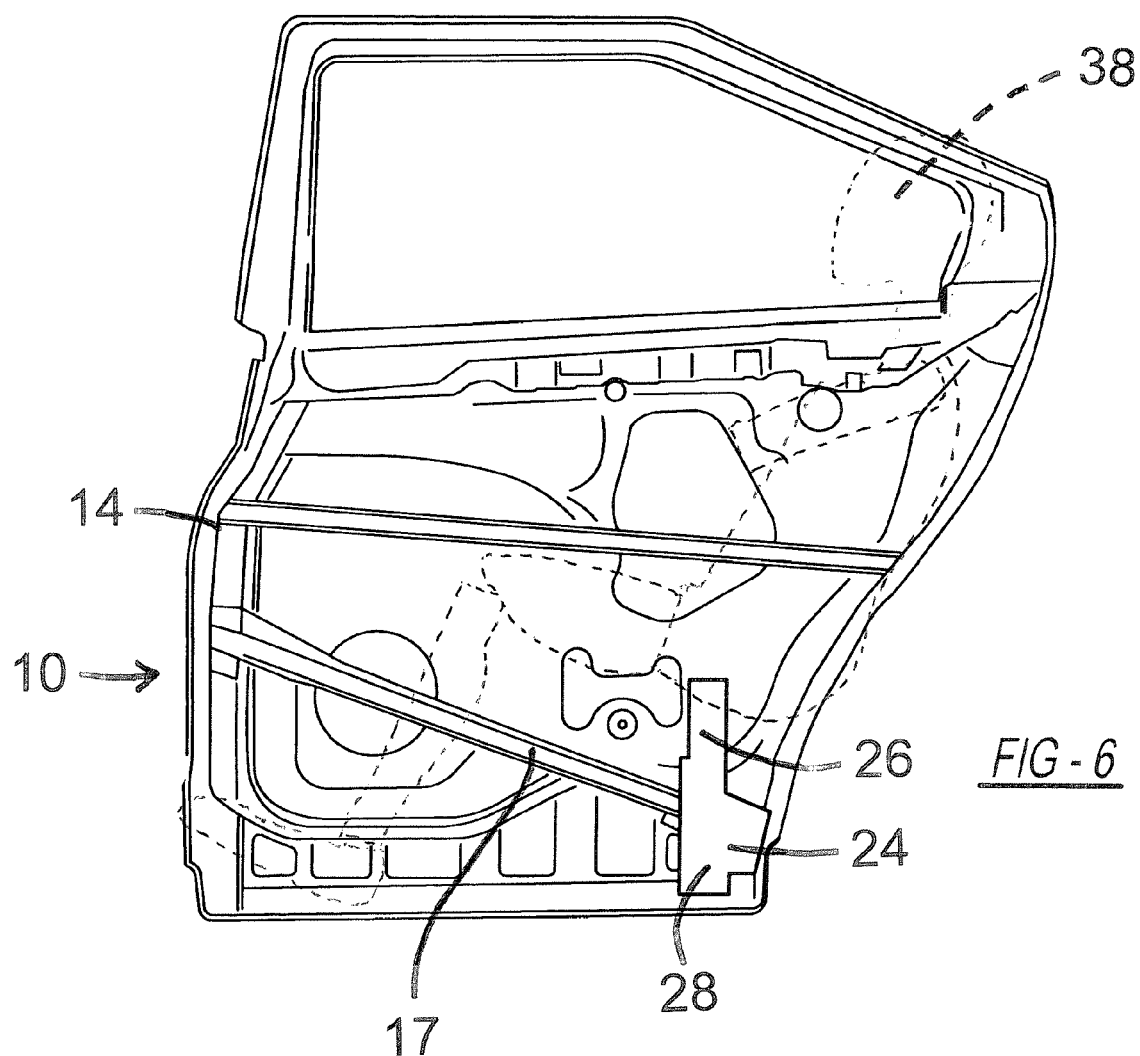
FIG. 6 illustrates the door assembly from the outside in partial transparent view showing the first embodiment of the door block of the disclosed invention in relation to the rest of the door as well as an adjacent diagrammatic view of a vehicle occupant.

FIG. 6 illustrates the vehicle door 10 viewed from the outside with the outer panel removed. An occupant 38 shown in broken lines more clearly illustrates the effectiveness of halting or significantly reducing vehicle inward movement of the vehicle door 10 or of any of its component parts. The disclosed design is effective at halting or significantly reducing such impacts whether they are sideways impacts or are longitudinal impacts.

As noted above, FIGS. 7 through 10 illustrate an alternate embodiment of the disclosed invention. In the embodiment illustrated therein, a vehicle door 100 is illustrated having an inner panel 114 and includes a door block 124 attached to the inner panel 114 having an upper portion 126 and a lower portion 128. The door block 124 as illustrated is a molded component having several intersecting rigid walls. The door block 124 may be molded from any of a variety of materials including aluminum or a polymerized material such as ABS plastic. This construction adds to strength while minimizing the amount of material and thus minimizing overall weight. The lower portion 128 of the door block 124 has a door guard beam contact surface 130 which has a geometry similar to or identical with the geometry of a door guard beam 117.

Figure 7:
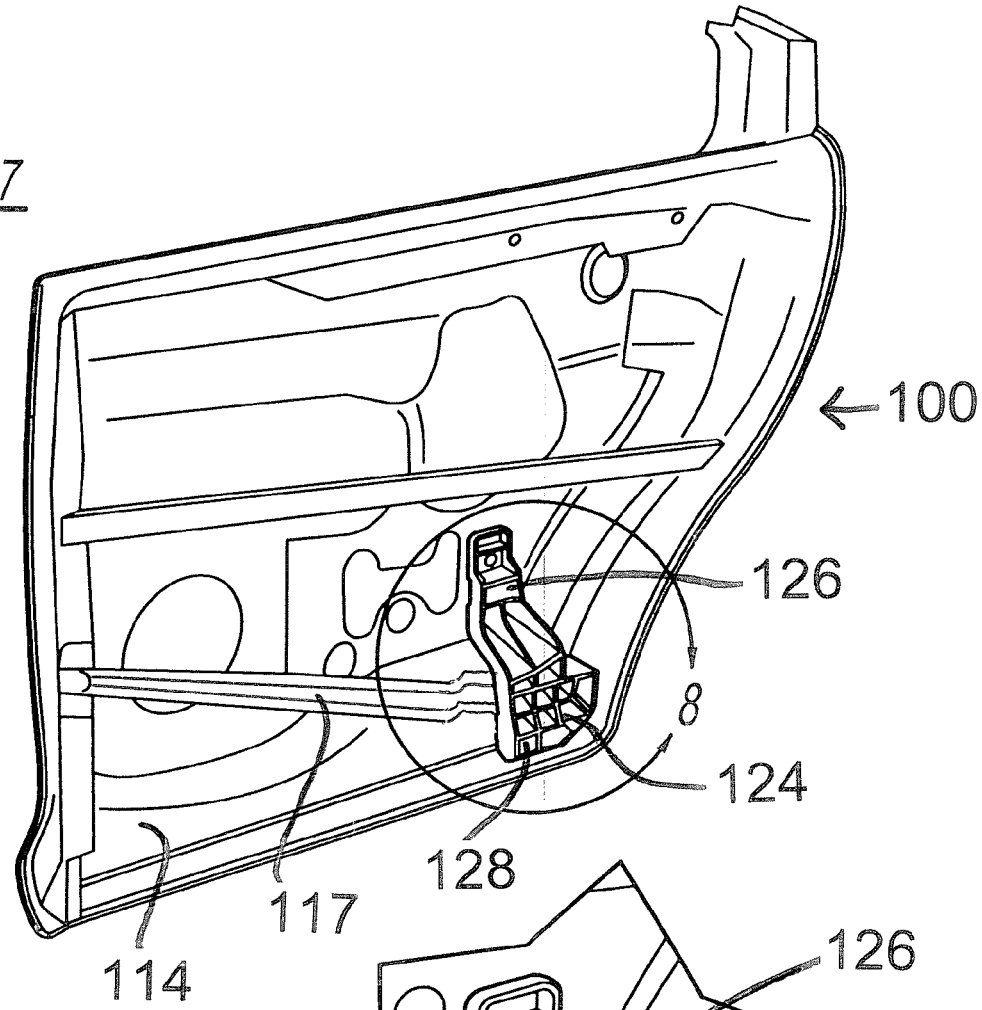
FIG. 7 illustrates a perspective view of a door assembly incorporating the door block of the second embodiment of the disclosed invention as viewed from the outside and shown without the outer panel of the vehicle door.

FIG. 7 illustrates the placement of the door block 124 in the vehicle door 100. As illustrated therein, the door block 124 is positioned at the lowest portion of the vehicle door 100. Furthermore, the door block 124 is positioned at the most rearward portion of the vehicle door 100. So positioned the door block 124 is substantially adjacent the rocker panel of the vehicle and the C-pillar of the vehicle. The door block 124 may be placed elsewhere within the vehicle door 100. Additional door blocks may be provided as well.

Figure 8:
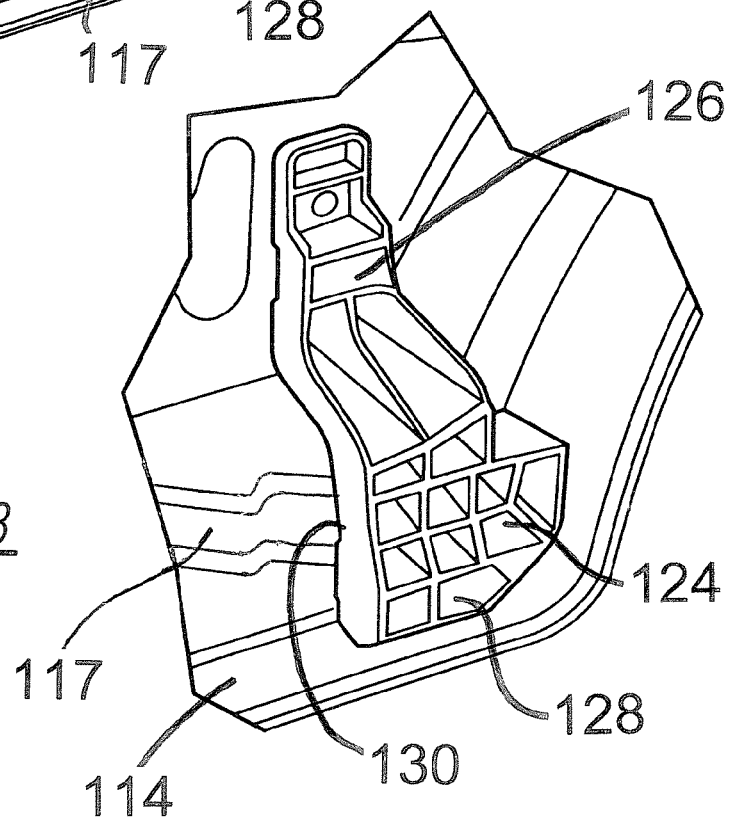
FIG. 8 illustrates a close-up view of the door block shown in FIG. 7.

FIG. 8 illustrates a more detailed view of the door block 124 and its position within the vehicle door 100 and is a close-up view of that shown in FIG. 7. As illustrated in FIG. 8, the door guard beam contact surface 130 is configured so as to mate with the door guard beam 117, their geometries being the same or substantially the same. This allows the door block 124 to be well coupled with the door guard beam 117 in a side impact event.

The lower portion 128 of the door block 124 is positioned outboard of the door guard beam 117. Thus positioned, during a side impact event the door block 124 engages with the door guard beam 117, the rocker panel and the C-pillar thus halting the vehicle inward movement of the vehicle door 100 or of any of its components.

FIG. 9 illustrates the vehicle door 100 when viewed from the inside of the vehicle. This figure more clearly illustrates a preferred shape of the door block 124 according to the second embodiment of the disclosed invention. FIG. 10 illustrates the door block 124 in isolation.

As noted above, the door block 124 is attached to the inner panel 114 of the door 100. The method of attachment is shown in FIGS. 9 and 10. With reference thereto, the upper portion 126 of the door block 124 is attached to the inner panel 114 by one or more fasteners such as bolts 132 and 133. While bolts 132 and 133 are illustrated the fasteners may be of any of a variety of fasteners known for the effective attachment of one component to another.

The lower portion 128 of the door block 124 is attached to the door guard 117 (shown in FIG. 9) by a fastener 134 such as the illustrated bolt. While only a single fastener 134 is shown there may be plural fasteners for such application. In addition to the illustrated bolt, the fastener 134 may be any of a variety of fasteners effective for such purposes. In the event that a bolt is used the door block 124 may have a keyway 136 shown in FIG. 10 shaped such that it fits the door guard beam attachment bolt.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An energy absorbing vehicle door comprising:
   an inner panel;
   an outer panel joined to said inner panel;
   a door beam between said inner panel and said outer panel; and
   a door block having a wide portion attached to said inner panel and a narrow portion, said door beam being fitted in part between said inner panel and said narrow portion.

2. The energy absorbing vehicle door of claim 1 wherein said door beam is attached to said narrow portion of said block.

3. The energy absorbing vehicle door of claim 2 further including a bolt fastener to attach said door beam to said lower portion of said block.

4. The energy absorbing vehicle door of claim 3 wherein said lower portion has a keyway for said bolt fastener.

5. The energy absorbing vehicle door of claim 1 wherein said door block is composed of a metal.

6. The energy absorbing vehicle door of claim 5 wherein said metal is aluminum.

7. The energy absorbing vehicle door of claim 1 wherein said door beam has a geometry and said narrow portion of said door block has a geometry, said geometry of said door beam being the same as said geometry of said door block.

8. A vehicle door assembly comprising:
   an inner panel;
   an outer panel joined to said inner panel;
   a door beam having an outer side and an inner side, said inner side being positioned adjacent said inner panel;
   a lower rear corner;
   a door block positioned in said lower corner, said door block including a portion attached to said inner panel and a portion adjacent said outer side of said door beam.

9. The vehicle door assembly of claim 8 wherein said outer side of said door beam has a geometry and said portion of said door block adjacent said door beam has a geometry, said geometry of said door beam and said geometry of said door block being the same.

10. The vehicle door assembly of claim 8 wherein said door beam is attached to said portion of said block adjacent said door beam.

11. The vehicle door assembly of claim 10 further including a bolt fastener to attach said door beam to said door block.

12. The vehicle door assembly of claim 11 wherein said door block has a keyway for said bolt fastener.

13. The vehicle door assembly of claim 8 wherein said door block is composed of a metal.

14. The vehicle door assembly of claim 13 wherein said metal is aluminum.

15. A vehicle door assembly comprising:
    an inner panel;
    an outer panel joined to said inner panel;
    a door beam between said inner panel and said outer panel;
    a door block having an upper portion attached to said inner panel and a lower portion spaced apart from said inner panel.

16. The vehicle door assembly of claim 15 wherein said upper portion is wider than said lower portion.

17. The vehicle door assembly of claim 16 wherein said door beam is partially fitted between said inner panel and said lower portion.

18. The vehicle door assembly of claim 15 wherein said door beam is attached to said lower portion of said block.

19. The vehicle door assembly of claim 18 further including a bolt fastener to attach said door beam to said lower portion of said block.

20. The energy absorbing vehicle door of claim 15 wherein said door beam has a geometry and said lower portion of said door block has a geometry, said geometry of said door beam being the same as said geometry of said lower portion of said door block.

* * * * *